United States Patent

Würsching et al.

(10) Patent No.: US 7,804,234 B2
(45) Date of Patent: Sep. 28, 2010

(54) SELF-BALLASTED COMPACT FLUORESCENT LAMP AND METHOD FOR MANUFACTURING

(75) Inventors: István Würsching, Erzsébet tér (HU); József Fülöp, Nápoly u. (HU); Ferenc Papp, Ugró Gyula u. (HU); László Bánkuti, Erdösor u. (HU)

(73) Assignee: General Electric Company, Schenectady, NY (US)

( * ) Notice: Subject to any disclaimer, the term of this patent is extended or adjusted under 35 U.S.C. 154(b) by 555 days.

(21) Appl. No.: 11/827,040

(22) Filed: Jul. 10, 2007

(65) Prior Publication Data

US 2009/0015131 A1 Jan. 15, 2009

(51) Int. Cl.
*H01J 5/48* (2006.01)
*H01J 1/62* (2006.01)

(52) U.S. Cl. .................. 313/493; 313/634; 313/318.01

(58) Field of Classification Search ................ 313/493, 313/318.01–318.08, 24, 47, 634, 56–58
See application file for complete search history.

(56) References Cited

U.S. PATENT DOCUMENTS 1,965,232 A 7/1934 Gustin
4,417,176 A * 11/1983 Kamei et al. .................. 315/59
(Continued)

FOREIGN PATENT DOCUMENTS

EP 1 175 131 A2 1/2002
(Continued)

OTHER PUBLICATIONS

PCT/US2008/065617 International Search Report, mailed Nov. 24, 2008.

*Primary Examiner*—Nimeshkumar D Patel
*Assistant Examiner*—Anne M Hines
(74) *Attorney, Agent, or Firm*—Fay Sharpe LLP

(57) ABSTRACT

A compact fluorescent lamp comprises a discharge tube arrangement with at least one discharge tube. The tube is formed of glass, encloses a discharge volume filled with a discharge gas and has a fluorescent phosphor coating disposed on the inner surface of the tube. The tube forms a continuous arc path and has electrodes disposed at each end of the arc path. The lamp also comprises a ballast circuit connected to the electrodes by lead-in wires and to a supply voltage by lead-out wires for controlling the current in the tube. A bulb shaped outer envelope comprises a substantially spherical portion, which encloses the tube arrangement and an elongated end portion, which encloses the ballast circuit. The end portion of the outer envelope has a neck portion with an open end on a base side for receiving a base shell. The open end of the neck portion is closed and terminated by a closing and neck reinforcing means of a material compatible with the material of the outer envelope, which has a substantially circular opening. The lead-out wires are led through the substantially circular opening to a base shell for connecting said lamp to said supply voltage through a socket.

A method for manufacturing a compact fluorescent lamp as described above is also disclosed. In the proposed method the open end of the elongated portion of the outer envelope is closed and terminated with a closing and neck reinforcing means comprising a substantially circular opening for leading through the lead-out wires.

12 Claims, 4 Drawing Sheets

U.S. PATENT DOCUMENTS

| | | | |
|---|---|---|---|
| 4,527,089 A | | 7/1985 | Bouchard et al. |
| 4,600,856 A | | 7/1986 | Bouchard et al. |
| 5,675,215 A | * | 10/1997 | Watson et al. ............... 313/493 |
| 6,064,155 A | | 5/2000 | Maya et al. |
| 6,445,131 B1 | * | 9/2002 | Wursching et al. ............ 315/56 |
| 2002/0145378 A1 | * | 10/2002 | Hui et al. .................... 313/483 |

FOREIGN PATENT DOCUMENTS

| | | |
|---|---|---|
| EP | 1 916 699 A2 | 4/2008 |
| WO | WO 2004/033960 A2 | 4/2004 |

* cited by examiner

SELF-BALLASTED COMPACT FLUORESCENT LAMP AND METHOD FOR MANUFACTURING

FIELD OF THE INVENTION

This invention relates to compact fluorescent lamps (CFL), and more particularly to compact fluorescent lamps that can replace incandescent lamps of general purpose. Even more specifically the invention relates to low-pressure compact fluorescent lamps that have an outer envelope and a ballast circuit within the outer envelope.

BACKGROUND OF THE INVENTION

The majority of the known and commercially available low-pressure fluorescent discharge lamps are so-called compact fluorescent lamps at present. These lamps are intended to replace incandescent lamps used in a wide field of industry and home applications. Main advantages of these lamps are a low-power consumption and a long lifetime. Disadvantageous is however in CFL-s their relatively high price and large length dimension. Many configurations have been proposed to solve the length dimension problem. Such solutions include the multiple tube arrangements and the coiled tube arrangements.

U.S. Pat. No. 4,527,089 discloses a compact fluorescent lamp (CFL) comprising multiple, individual tubes mechanically formed into an assembly and inserted into an outer envelope. The individual open-ended tubes are connected to each other through an arc directing means to form a continuous arc path. The outer envelope has a cylindrical shape, is hermetically sealed and includes an arc generating and sustaining medium such as an atmosphere of mercury and argon. The electric wires of the fluorescent lamp as lead-in wires are led through a flare that serves as a sealing element of the cylindrical outer envelope. The ballast circuit providing energy for the fluorescent lamp is situated outside the outer envelope and therefore it requires special contact elements and arrangement.

U.S. Pat. No. 4,600,856 describes a compact low pressure arc discharge lamp with multiple tubes frictionally fitted into apertures in a base plate. The base plate is held in a fixed position inside the sealed outer envelope but there is no built in ballast in the outer envelope or bulb. A CFL of such a construction has to be connected to outer ballast, which requires external electric connections and a special connection means to connect the ballast to a power supply.

U.S. Pat. No. 6,064,155 discloses a fluorescent lamp with an outer envelope having an external shape of an incandescent lamp on a standard Edison-type base. The discharge tube is wound in a coil around the axis of the envelope and is disposed within the outer envelope. Ballast is also disposed within the outer envelope. A heat shield is disposed between the lamp and the ballast to thermally isolate the lamp from the ballast, whereby heat from the lamp will not adversely affect the ballast. Although this lamp is provided with integrated ballast inside the outer envelope, serious difficulties may arise during production due to the use of the heat shield disposed between the lamp and the ballast. It is not disclosed and therefore it is not clear from this document how the lamp and the ballast circuit is positioned and fixed inside the outer envelope and how the electrical connection between the lamp electrodes and the ballast circuit or between the ballast circuit and the base is established.

Accordingly, there is a need for a compact fluorescent lamp with integrated ballast inside the outer envelope and an improved configuration in order to make the lamp easier to manufacture and therefore to provide a CFL that is cheaper. There is also need for an improved method of production, which is easy to combine with the conventional manufacturing steps and therefore compatible with mass production. It is sought to provide a compact fluorescent lamp configuration, which readily supports different types of discharge tube configurations.

SUMMARY OF THE INVENTION

In an exemplary embodiment of the present invention, there is provided a compact fluorescent lamp comprising a discharge tube arrangement with at least one discharge tube. The tube is formed of glass, encloses a discharge volume filled with a discharge gas and has a fluorescent phosphor coating disposed on the inner surface of the tube. The tube forms a continuous arc path and is provided with electrodes disposed at each end of the arc path. The lamp also comprises a ballast circuit connected to the electrodes by lead-in wires and to a supply voltage by lead-out wires for controlling the current in the tube. A bulb shaped outer envelope comprising a substantially spherical portion encloses the tube arrangement and an elongated end portion encloses the ballast circuit. The end portion of the outer envelope has a neck portion with an open end for receiving a base shell. The open end of the neck portion is closed and terminated by a closing and neck reinforcing means of a material compatible with the material of the outer envelope. The closing and neck reinforcing means is provided with a substantially circular opening for leading through and receiving the lead-out wires in order to establish electrical connection with said supply voltage through a socket.

In an exemplary embodiment of another aspect of the present invention a method for manufacturing a compact fluorescent lamp is proposed. The method comprises the following steps. An outer envelope comprising a substantially spherical portion and an elongated end portion with a neck portion being terminated by an open end for receiving a base shell is provided. The open end of the neck portion of the envelope is closed and terminated with a flare comprising a blow tube of a material compatible with the material of the outer envelope. At least the blow tube is removed from the flare by cutting a substantially circular opening in the flare. The envelope is separated into two parts by cutting along a circumferential line in a plane substantially perpendicular to the principal axis of the envelope. An upper part receives a discharge tube arrangement with lead-in wires and a lower part terminated by the closing and neck reinforcing means at a base side receives a ballast circuit with connection points for lead-out wires of the power supply and lead-in wires of the discharge tube arrangement. The lead-in wires of the discharge tube arrangement and the lead-out wires of the power supply are connected to the respective connection points of the ballast circuit, thereby providing a lamp ballast assembly. The ballast circuit part of the lamp ballast assembly is introduced into the lower part of the envelope and the lead-out wires are led through the substantially circular opening of the closing and neck reinforcing means. The two separated parts of the envelope are brought into contact with each other along the separating line. The upper and lower part of the envelope are connected and sealed along the separating line. The neck portion of the envelope is provided with a base shell and the lead-out wires are connected to contact terminals of the base.

The disclosed compact fluorescent lamps provide for a simplified structure of the CFL components as well as a simplified method of production thereof. By using a closing means with a substantially circular opening and leading the lead-out wires through this opening as suggested above, the consecutive manufacturing steps may be simplified, thereby providing better conditions for mass production. In the production of conventional incandescent lamps, a flare with an exhaust tube is used for closing, evacuating and filling the envelope and to establish a sealed closure of the envelope. The electrodes are sealed into the flare. In the compact fluorescent lamp of the present invention, no sealed closure of the envelope and therefore no exhaust-tube are required, only a similar blow tube is used as long as the neck portion is formed. This blow tube can be removed afterwards in order to provide a substantially circular opening for leading through the lead-out wires. The largest possible opening for leading through the lead-out wires could be obtained by removing the whole flare and the blow tube. It has been found however that by removing only an inner part of the flare, also including the blow tube, the remaining outer part of the flare would serve as a neck reinforcing means. The main advantage of this remaining closing and neck reinforcing means is an increased mechanical strength of the open ended neck portion which is necessary during production in order to minimize the risk of damage until the base shell is attached.

The use of a flare with a blow tube provides a possibility to make benefit of the production line used for manufacturing conventional incandescent lamps, which also reduces the cost of production especially when compared with other GLS (General Lighting Service) look alike lamps. Further advantage of this lamp is the full mechanical and electric compatibility with bulb-shaped incandescent lamps that makes it an efficient replacement lamp. The proposed lamps provide a certain level of protection against environmental load due to the outer envelope.

BRIEF DESCRIPTION OF THE DRAWINGS

The invention will now be described in detail with reference to the enclosed drawing, in which.

DETAILED DESCRIPTION OF THE INVENTION

Figure 1:
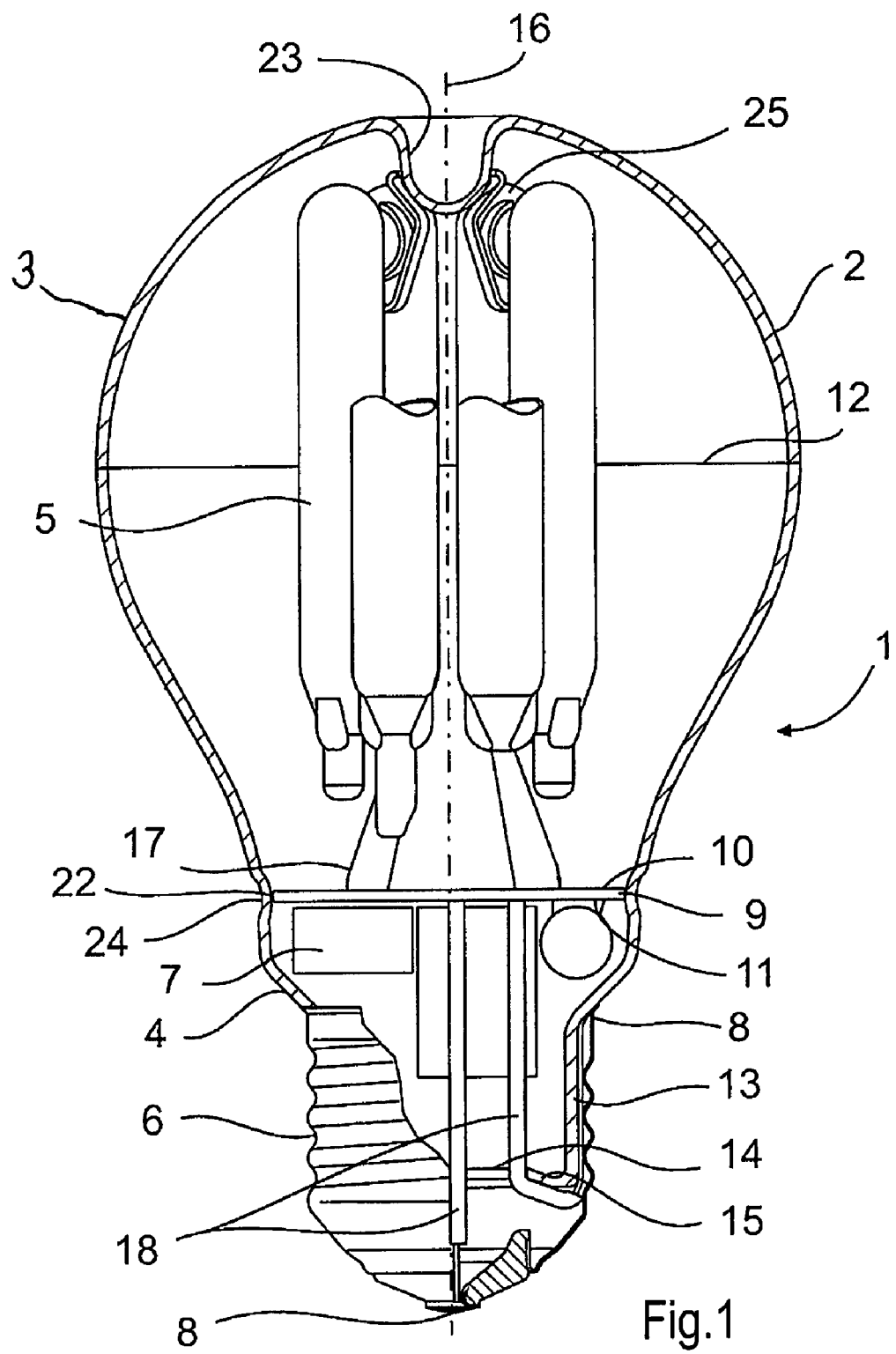
FIG. 1 is a side view, partially in cross section, showing a self ballasted CFL with an outer envelope.

Referring first to FIG. 1, a low-pressure discharge lamp 1 is shown. The lamp is a fluorescent discharge lamp, with an outer envelope 2 enclosing a discharge tube arrangement 5 and a ballast circuit 7. The outer envelope 2 has a spherical upper part 3 and an elongated lower part 4 with an open-ended neck portion 13, which is connected to a shell of a base 6. The outer envelope may be made of glass. The outer envelope 2 is cut in two parts and separated along a cutting line 12 in order that the ballast circuit 7 and the discharge tube arrangement 5 can be inserted and connected inside the outer envelope 2 as described in detail below. The discharge tube arrangement 5 may comprise a single discharge tube or a plurality of elongated discharge tubes. The discharge tubes are made of glass, enclose a discharge volume filled with a discharge gas, and have a fluorescent phosphor coating disposed on the inner surface of the tubes. The ends of the tubes are sealed in a gas tight manner. At the ends of the arc path the tubes are provided with electrodes and lead-in wires 17 connected to the electrodes. The lead-in wires 17 of the discharge tube arrangement 5 are connected to the ballast circuit 7 for controlling the current in the discharge tubes. The ballast circuit 7 is further connected to a supply voltage through lead-out wires 18 which are connected to contact terminals 8 in the lamp base 6. As shown in FIG. 1, the open end of the neck portion 13 of the outer envelope 2 is closed and terminated by a closing and neck reinforcing means 15 of a material compatible with the material of the outer envelope. The closing and neck reinforcing means 15 is provided with a substantially circular opening 14. The lead-out wires 18 are isolated from each other and lead through the substantially circular opening 14 to the base 6 for connecting said lamp to said supply voltage through a socket. The lamp base is configured to be adapted to a socket, which may be of any type normally used for lamps. The lamp base may be configured to fit in a screw type socket or a bayonet socket. In the shown embodiment the base shell connected to the neck portion is a screw type or Edison type base shell, which has a form closure with the outer wall of the neck portion. For this purpose the neck portion has a threaded outer wall. This threaded outer wall is not necessary if a bayonet type base shell is used. In this case the connection is established and secured by an adhesive.

The ballast circuit 7 is mounted on a printed circuit board (PCB) 9, which has a component side 11 or surface facing toward said base 6, a wiring side 10 or surface facing toward said discharge tube arrangement 5 and an edge portion 22 following the shape of the outer envelope 2. The edge portion 22 of the printed circuit board 9 carrying the ballast circuit 7 has advantageously a preferably circular boundary form according to the cross sectional configuration of the wall of the outer envelope 2 taken substantially perpendicularly to the principal axis 16 of the lamp 1. Although the shown embodiment depicts a PCB in a substantially horizontal plain, it may be apparent to those skilled in the art that the PCB may also be accommodated vertically or in other orientation in the outer envelope.

In order to provide a better holding of a horizontally oriented printed circuit board 9 of the ballast circuit 7, the outer envelope 2 may have a circumferential groove 24 with an inside surface of the groove being in direct or indirect contact with the printed circuit board 9, as shown in FIG. 1. To avoid tension in the envelope wall due to thermal expansion of the printed circuit board 9, a flexible sealing material may be applied between the outer envelope 2 and the edge portion 22 of the printed circuit board 9.

The printed circuit board 9 carrying the ballast circuit 7 comprises connection points or terminals for connecting the lead-out wires 18 of the power supply and the lead-in wires 17 of the electrodes of the discharge tubes. The terminals for connecting the lead-out wires 18 of the power supply and for connecting the lead-in wires 17 of the electrodes of the discharge tubes are accessible from at least the upper side 10 of the printed circuit board facing the discharge tube arrangement 5.

The discharge tube arrangement 5 may be connected to fixing means 25 for fixing the position of the discharge tube arrangement 5 inside the outer envelope 2. The fixing means 25 may be of metal, plastic or similar material sufficiently strong and flexible in order to hold the discharge tube arrangement 5 in a fixed position inside the outer envelope 2 and providing sufficient protection against mechanical vibration and shocks. The fixing means 15 may be connected to the discharge tube arrangement 5 and the outer envelope 2 in a permanent or a releasable way. Gluing, soldering, welding or the like may establish a permanent connection. A releasable connection may be realized by using clips, snap-in fixtures, springs or the like. In the shown embodiment, the fixing means 25 is connected to an arcuate recess 23 formed in the spherical portion 3 of the outer envelope 2.

The discharge tubes enclosing a discharge volume and being filled with discharge gas are substantially tubular. In the shown embodiment, they are cylindrical, but other suitable cross sections may be selected as well. The discharge tubes are made of glass in the shown embodiments. It is preferred that the wall thickness of the discharge tubes should be substantially constant, mostly from a manufacturing point of view, and also to ensure an even discharge within the discharge tubes along their full length.

In order to provide visible light, the internal surface of the discharge tubes is covered with a fluorescent phosphor layer (not shown). This phosphor layer is within the sealed discharge volume. The composition of such a phosphor layer is known per se. This phosphor layer converts the UV radiation into visible light. The phosphor layer is applied to the inner surface of the discharge tubes before they are sealed.

In one exemplary embodiment of the present invention, the discharge tube arrangement 5 may be comprised of substantially straight tube members with a longitudinal axis substantially parallel with the principal axis 16 of the fluorescent lamp. The neighboring discharge tube members are connected to each other in series by bridges to form a continuous arc path, and arranged substantially at equal distance from the principal axis 16 of the fluorescent lamp and from each other to provide a substantially homogenous illumination. This configuration of the discharge tube arrangement may comprise two or more individual, elongated, substantially parallel, straight discharge tube members of substantially same length, which are interconnected by a bridge to form a continuous arc path. The discharge tube arrangement is provided with electrodes and lead-in wires 17 connected to the electrodes at both ends of the arc path. The number of the individual discharge tube members will determine the output luminous intensity. The discharge tube arrangement may also comprise one or more individual, elongated discharge tube members bent in an U-shape of substantially the same length, which are interconnected by a bridge to form a continuous arc path. The number of the individual discharge tube members will be proportional to the output luminous intensity. The U-shaped discharge tube members may comprise substantially parallel straight sections defining the length of the discharge tube arrangement and a curved middle section.

In another exemplary embodiment of the present invention (see FIGS. 7 to 10), the discharge tube arrangement 5 may be comprised of a single tube with substantially straight end sections and an intermediate portion between the end sections. The end sections are at one end of the tube arrangement 5 and in proximity to each other and the intermediate portion has a coiled configuration wound about the principal axis 16 of the lamp 1 to provide a substantially homogenous illumination. The overall length of the discharge tube or similarly the number of windings in the coiled intermediate portion will be proportional to the output luminosity of the lamp. The diameter of the windings is selected as large as possible in order to fill and fit into the outer envelope.

Figure 2:
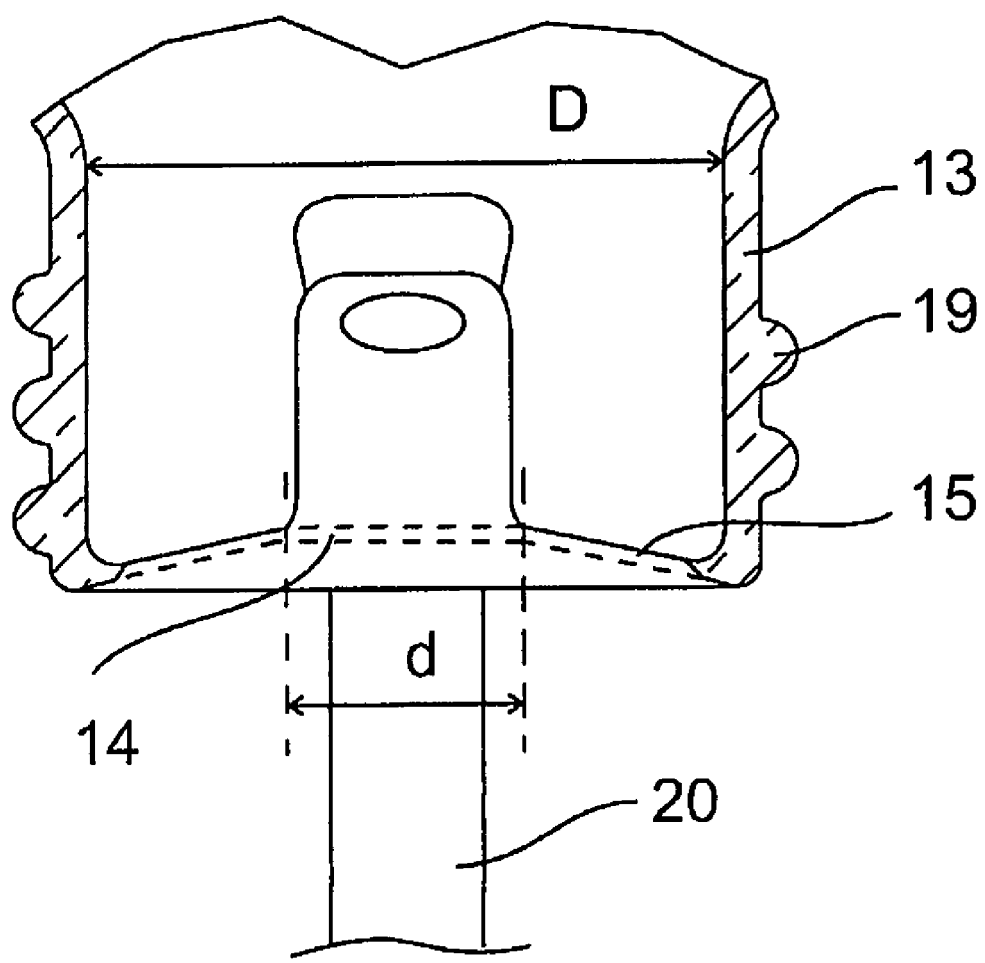
FIG. 2 is an enlarged view of a neck portion of the outer envelope with a flare and blow tube partly in cross section.

As shown in FIG. 2, the open end of the neck portion 13 of the outer envelope 2 is closed and terminated by a flare and blow tube 20 assembly of a material compatible with the material of the outer envelope. After cutting out a portion of the flare and blow tube assembly, or at least cutting out the blow tube 20, a closing and neck reinforcing means 15 of a material compatible with the material of the outer envelope is formed. The cut out portion leaves a substantially circular opening 14 (marked with dotted lines) that provides for receiving and leading through the lead-out wires. The neck portion 13 has a substantially cylindrical wall with a treaded portion 19 on the outer wall and an inner diameter D. After removal of at least the blow tube 20, the resulting substantially circular opening 14 has a diameter of d. The ratio of the diameter (d) of the substantially circular opening of the closing and neck reinforcing means to the inner diameter (D) of the cylindrical wall of the neck portion is in the range of $1/5<d/D<4/5$. Selecting a ratio of higher than 4/5 would negatively affect the reinforcing capability of the closing means and a ratio less than 1/5 would not allow the blow tube to be removed. In a preferred embodiment the ratio of the diameter (d) of the substantially circular opening of the closing and neck reinforcing means to the inner diameter (D) of the cylindrical wall of the neck portion is in the range of $1/4<d/D<3/4$. More preferably, this range may be $1/3<d/D<3/4$.

In FIG. 2, there is shown a neck portion, which is closed with a similar flare used in incandescent lamps as a stem or mount. This flare is combined with a cylindrical part with a sealed end and a blow tube, which is used in incandescent lamps as an exhaust tube for evacuating and filling the envelope. In such configurations, not only the blow tube but also a substantially cylindrical part of the flare and blow tube assembly has to be removed, which results in a larger d/D ratio. The advantage achieved by removing the substantially cylindrical part of the flare and blow tube 20 assembly is in the possibility of obtaining a larger room for receiving and leading through the lead-out wires.

Figure 3:
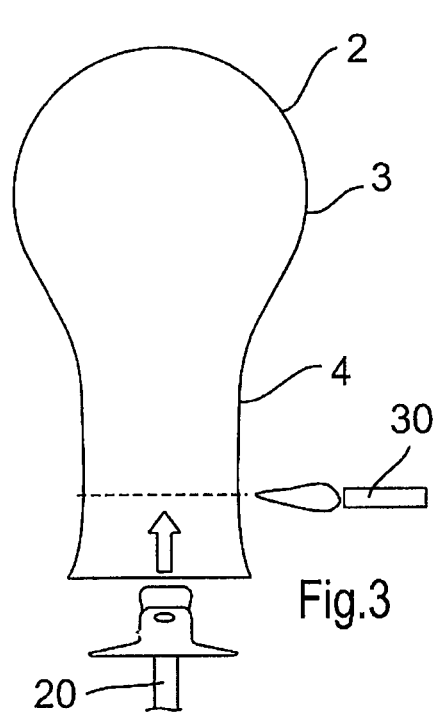
FIG. 3 is a schematic diagram of providing an outer envelope with a neck portion in the manufacturing of the lamp.

Referring now to FIGS. 3 to 10, the steps of producing a compact fluorescent lamp with an outer envelope having a closing and neck reinforcing means of a material compatible with the material of the outer envelope will be described in more detail. In step one, as depicted in FIG. 3, an outer envelope 2 with a substantially spherical portion 3 and an elongated end portion 4 is provided. The elongated end portion 4 has an open end. During manufacturing of the outer envelope a blank is used which has a spherical portion 3 and a longer elongated portion 4 than required. Therefore in the first step the overhanging part of the elongated portion 4 has to be removed and the resulting opening and has to be closed by the closing and neck reinforcing means 15. This is accomplished by heating the elongated portion 4 along a circumferential line marked with a dotted line in the drawing with a burner 30. Due to the heating, the glass material is caused to soften and to separate along the selected circumferential line marked with the dotted line. After removal of the separated part of the elongated portion, a flare with a blow tube is connected and sealed with the open end of the elongated portion.

Figure 4:
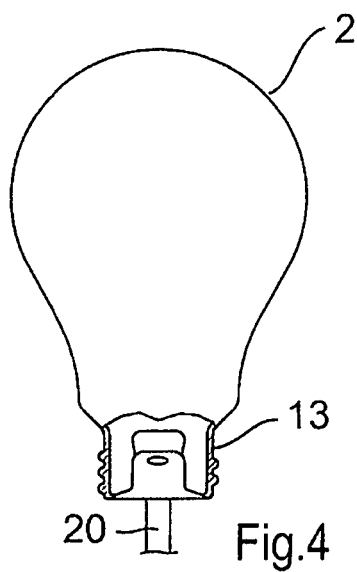
FIG. 4 is a schematic diagram of closing the open end of the neck portion of envelope with a flare having a blow tube and providing it with a threaded portion in the manufacturing of the lamp.

In a second step, as shown in FIG. 4, a neck portion with a threaded outer wall is formed. For this purpose, heat at a predetermined temperature is applied continuously to the end section of the elongated portion in order to keep the glass material in a softened state. Then the softened end section of the elongated portion is placed into a mould having side portions each with a contoured shape for forming the neck portion with a threaded outer wall. A threaded outer wall, as shown in the drawing is only needed if a screw type base shell is used. For other types of a base shell, for example if a bayonet type base shell is used, this threaded outer surface may be omitted and a different mould die will be used for forming the neck portion. While this mould is closed, a gas having a sufficient pressure is applied through the blow tube 20 to cause the neck portion of outer envelope to expand and take the shape of the contoured shape of said mould.

Figure 5:
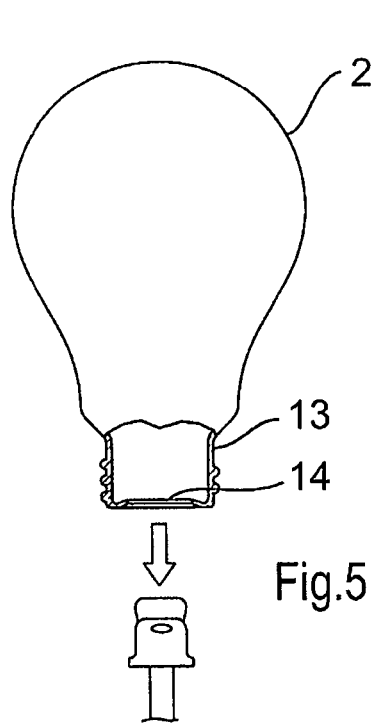
FIG. 5 is a schematic diagram of removing at least the blow tube from the flare in the manufacturing of the lamp.

In a third step, as shown in FIG. 5, a substantially circular opening is formed in the closing and neck reinforcing means by cutting out a part of the flare along a substantially circular line. During this cutting step at least the blow tube 20 will be removed. When cutting a smaller part and removing only the blow tube a smaller d/D ratio may be achieved which will result in a stronger reinforcing capability of the closing means. According to another aspect of the invention, during this cutting step a cylindrical part of the flare (also referred to as a stem tube) will also be removed as it can be seen best on FIG. 2. When cutting a greater part and removing also the stem tube a greater d/D ratio may be achieved which will provide more room for receiving and leading through the lead-out wires of the ballast circuit. As disclosed in connection with FIG. 4, the flare with the blow tube is necessary in order to provide a closure of the outer envelope and to apply an increased pressure during forming the neck portion. After forming the neck portion the flare and the blow tube are not needed any more and they could be removed as a whole. According to the invention however it has been found that a further reinforcing of the neck portion is most advantageous in order to increase the mechanical strength of the neck portion and thereby to decrease a possible damage during further manufacturing steps until the base shell is attached. The optimum d/D ration depends for example on the size of the base shell to be fitted to the outer envelope, the tools for cutting out the flare and blow tube assembly, and details of the manufacturing process, e.g. flame position, speed of the manufacturing machine, allowable stress in the reinforcing means.

The substantially circular opening also provides for a gas communication between the inside volume of the outer envelope and the outside atmosphere, which may be advantageous during operation when different gaseous products are released within the outer envelope. During lamp operation, the PCB material heats up and can release different gaseous materials.

Figure 6:
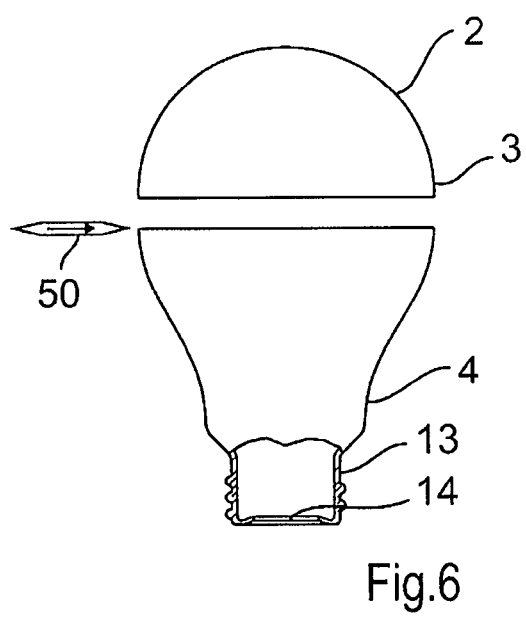
FIG. 6 is a schematic diagram of separating the outer envelope in the manufacturing of the lamp.
Figure 7:
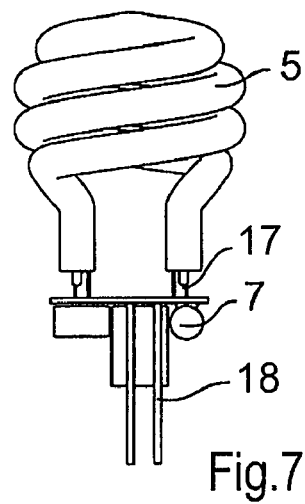
FIG. 7 is a schematic diagram of connecting the ballast circuit to a discharge tube arrangement in the manufacturing of the lamp.
Figure 8:
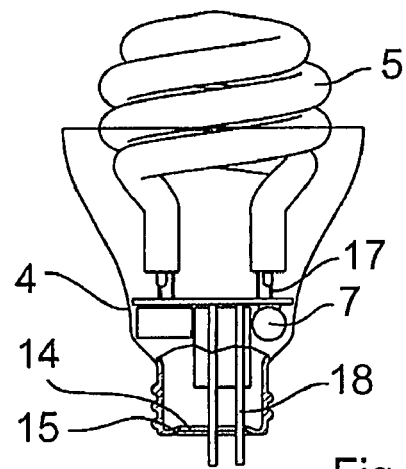
FIG. 8 is a schematic diagram of inserting the lamp ballast assembly into a lower part of the outer envelope in the manufacturing of the lamp.
Figure 9:
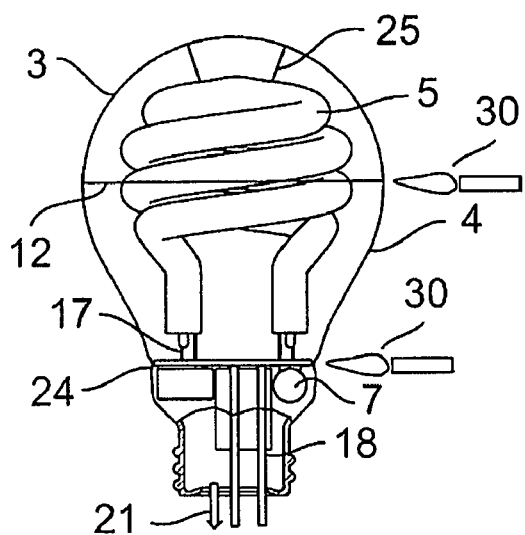
FIG. 9 is a schematic diagram of connecting and sealing the two parts of the envelope in the manufacturing of the lamp.
Figure 10:
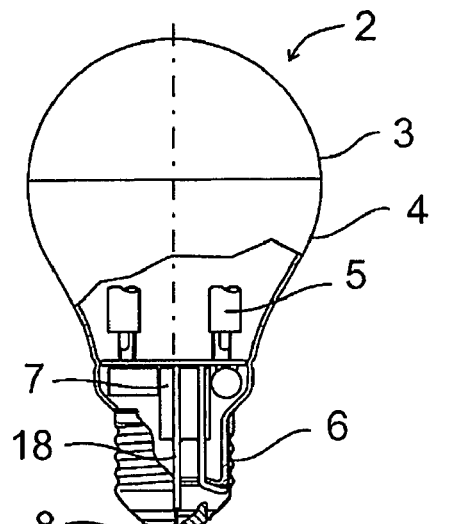
FIG. 10 is a schematic diagram of providing the closed end of the envelope with a base and contact terminals in the manufacturing of the lamp.

In a fourth step, as shown in FIG. 6, the outer envelope 2 is cut in two parts with a cutting dye 50. This may be preferably done by rotating the envelope around its principal axis while bringing it into a cutting position of the cutting dye, which can also rotate. The separation line created in this way has a circumferential or preferably circular form in a plane substantially perpendicular to the principal axis of the envelope. The upper part 3 is removed from the lower part 4, which lower part houses the closing and neck reinforcing means 15 also comprising the substantially circular opening 14. The position of the separation line is selected near the largest diameter of the spherical portion of the outer envelope in order to provide better access to the parts inside the envelope and to enable the use of larger sized discharge tube arrangements.

In a fifth step (FIG. 7), the ballast circuit 7 is connected electrically with the discharge tube arrangement 5 by lead-in wires 17 and to lead-out wires 18 of the power supply and thereby providing a lamp-ballast assembly. One possible way of connecting the lead-in wires and the lead-out wires to the ballast is soldering the insulation free ends of the wires with corresponding connection points or terminals of the ballast circuit.

In a sixth step (FIG. 8), the lamp-ballast assembly is inserted into the lower part 4 of the outer envelope 2, which is already provided with the closing and neck reinforcing means 15 comprising the substantially circular opening 14. While inserting the lamp-ballast assembly into the lower part 4 of the outer envelope, the lead-out wires 18 are led through the substantially circular opening 14. In order to provide electrical insulation between the two lead-out wires, at least one of the wires has to be provided with an insulating layer. The base side end of the lead-out wire provided with an insulating layer has to be free in order to enable electrical contact with one of the contact terminals of the base. The position of the plane of the printed circuit board carrying the ballast circuit is selected as low as possible in proximity of the closing and neck reinforcing means 15 in order to keep the lead-out wires 18 as short as possible. Before closing the envelope or before rejoining the two separated parts of the envelope, a fixing means 25 has also to be connected to the discharge tube arrangement or to the inner surface of the upper part of the outer envelope.

In a seventh step (FIG. 9), the upper part 3 of the outer envelope is rejoined and sealed with the lower part 4. In order to accomplish a solid mechanical connection or seal between the upper part 3 and the lower part 4 of the outer envelope, the two parts may be welded together using a heater 30, which may be a gas heater. The position of the circumferential separation line 12 of the outer envelope has been selected in the region above the plane of the printed circuit board carrying the ballast circuit at a distance sufficient to protect the ballast circuit from the heat of the heater 30. The plane of the circumferential separation line and that of the printed circuit board carrying the ballast circuit are separated from each other by a security distance. After rejoining of the two parts of the outer envelope, the gas heater is moved to a lower position near to the PCB of the ballast circuit in order to soften the glass material of the outer envelope. Due to applying a vacuum inside the outer envelope, marked by arrow 21, the softened part of the glass material of the outer envelope is brought into contact with the edge of the PCB. After removal of the applied heat and the vacuum, a circumferential groove 24 remains, which groove provides a mechanical support and fixing of the PCB of the ballast circuit. In case of vertical or other orientation of the PCB of the ballast circuit, only the upper end portion of the PCB needs to be secured. To avoid tension in the envelope wall due to thermal expansion of the printed circuit board 9, a flexible sealing material may be applied between the outer envelope 2 and the edge portion of the printed circuit board 9.

Finally, in an eighth step (FIG. 10), the fluorescent discharge lamp is completed with a shell of a base 6 for connecting the lamp to a conventional or standard socket of any screw-in or bayonet type. In the shown example as it can be seen in FIG. 10, the compact fluorescent lamp is provided with an Edison-type base. The lamp base is fixed to the base side end of the elongated portion of the outer envelope in any conventional way. The base side end of the elongated portion of the outer envelope may be fixed to the base using an adhesive, cement or a threaded connection. When using a threaded connection with the Edison-type base, it may be screwed onto the threaded end portion of the envelope. The electrical contacts of the lead-out wires of the power supply and the contact terminals 8 of the base are also created in this step.

The invention is not limited to the shown and disclosed embodiments, but other elements, improvements and variations are also within the scope of the invention. For example, it is clear for those skilled in the art that a number of other forms of the envelope 2 may be applicable for the purposes of the present invention, for example the envelope may have an elliptical or polygonal cross-section. The general cross-section of the tubular discharge vessels need not be strictly circular either (as with a cylindrical discharge vessel), for example it may be elliptical in general. The number of discharge tube members within a lamp 1 may also vary according to size or desired power output of the lamp.

The invention claimed is:

1. A compact fluorescent lamp comprising
   a discharge tube arrangement, said discharge tube arrangement being formed of at least one discharge tube made of glass, enclosing a discharge volume filled with a discharge gas, and having a fluorescent phosphor coating disposed on the inner surface of the tube, the tube forming a continuous arc path and further being provided with electrodes disposed at each end of the arc path;
   a ballast circuit mounted on a printed circuit board for controlling current in the tube and being connected to the electrodes by lead-in wires and to a supply voltage by lead-out wires;
   a bulb-shaped outer envelope comprising a substantially spherical portion enclosing the discharge tube arrangement, and an elongated end portion enclosing the ballast circuit and having a circumferential groove with an inside surface of the groove being in contact with the printed circuit board of the ballast circuit;
   the end portion of the outer envelope having a neck portion with an open end for receiving a base shell;
   the open end of the neck portion being closed and terminated by a closing and neck reinforcing means of a material compatible with the material of the outer envelope; and
   the closing and neck reinforcing means comprising a substantially circular opening, through which the lead-out wires are led to a base for connecting said lamp to said supply voltage through a socket.

2. The compact fluorescent lamp of claim 1, in which the neck portion has a substantially cylindrical wall with an inner diameter (D) and the ratio of the diameter (d) of the substantially circular opening of the closing and neck reinforcing means to the inner diameter (D) of the cylindrical wall of the neck portion is in the range of 1/5<d/D<4/5.

3. The compact fluorescent lamp of claim 2, in which the ratio of the diameter (d) of the substantially circular opening of the closing and neck reinforcing means to the inner diameter (D) of the cylindrical wall of the neck portion is in the range of 1/4<d/D<3/4.

4. The compact fluorescent lamp of claim 2, in which the ratio of the diameter (d) of the substantially circular opening of the closing and neck reinforcing means to the inner diameter (D) of the cylindrical wall of the neck portion is in the range of 1/3<d/D<3/4.

5. The compact fluorescent lamp of claim 1, in which the outer envelope and the closing and neck reinforcing means are made of glass.

6. The compact fluorescent lamp of claim 1, in which the base shell is a threaded base shell.

7. The compact fluorescent lamp of claim 1, in which the base shell is a bayonet base shell.

8. The compact fluorescent lamp of claim 1, in which the outer envelope is comprised of two parts separated along a circumferential line in a plane substantially perpendicular to the principal axis of the envelope, the two parts of the envelope being connectable and sealable to form a uniform bulb shaped envelope.

9. The compact fluorescent lamp of claim 8, in which the ballast circuit is received in a lower part of the envelope terminated by the closing and neck reinforcing means and positioned in a plane substantially parallel to the separation plane at a distance from the separation plane sufficient for thermal protection during connecting and sealing the two parts.

10. The compact fluorescent lamp of claim 1, in which the discharge tube arrangement is comprised of substantially straight tube members with a longitudinal axis substantially parallel to the principal axis of the fluorescent lamp and the neighboring tube members being connected to each other in series to form a continuous arc path, and the tube members being arranged substantially at equal distance from the principal axis of the fluorescent lamp and from each other to provide a substantially homogenous illumination.

11. The compact fluorescent lamp of claim 1, in which the discharge tube arrangement is comprised of a single tube with substantially straight end sections and an intermediate portion between the end sections and the end sections being at one end of the tube arrangement and in proximity to each other and the intermediate portion having a coiled configuration wound about the principal axis of the lamp to provide a substantially homogenous illumination.

12. Method for manufacturing a compact fluorescent lamp comprising the steps of:
   a) providing an outer envelope comprising a substantially spherical portion and an elongated end portion with a neck portion being terminated by an open end for receiving a base shell;
   b) closing and terminating the open end of the neck portion of the envelope with a flare comprising a blow tube of a material compatible with the material of the outer envelope,
   c) cutting a substantially circular opening in the flare and thereby removing at least the blow tube;
   d) separating the envelope by cutting along a circumferential line in a plane substantially perpendicular to the principal axis of the envelope into an upper part for receiving a discharge tube arrangement with lead-in wires and a lower part terminated by the closing and neck reinforcing means at a base side for receiving a ballast circuit with connection points for lead-out wires of the power supply and lead-in wires of the discharge tube arrangement;
   e) connecting the lead-in wires of the discharge tube arrangement and the lead-out wires of the power supply to the respective connection points of the ballast circuit, thereby providing a lamp ballast assembly;
   f) introducing the ballast circuit part of the lamp ballast assembly into the lower part of the envelope and leading the lead-out wires through the substantially circular opening of the closing and neck reinforcing means;
   g) bringing the separated upper part and lower part of the envelope along the separating line into contact with each other;

h) connecting and sealing the upper and lower part of the envelope along the separating line;

i) providing the outer envelope with a circumferential groove with an inside surface of the groove being in contact with the printed circuit board of the ballast circuit, j) providing the neck portion of the envelope with a base shell; and k) connecting the lead-out wires to contact terminals of the base.

\* \* \* \* \*